(12) United States Patent
Jensen

(10) Patent No.: US 6,191,252 B1
(45) Date of Patent: *Feb. 20, 2001

(54) METHOD OF PREPARING POLYMERS WITH LOW MELT VISCOSITY

(76) Inventor: Brian J. Jensen, 127 Branscome Blvd., Williamsburg, VA (US) 23185

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/666,793

(22) Filed: Jun. 18, 1996

Related U.S. Application Data

(63) Continuation-in-part of application No. 08/622,176, filed on Mar. 5, 1996, now abandoned.

(51) Int. Cl.[7] .......................... C08G 69/26; B32B 27/00
(52) U.S. Cl. ................ 528/335; 528/332; 428/473.5; 264/45.1; 264/232
(58) Field of Search .................... 528/332, 335, 528/86; 428/424.2, 473.5; 264/45.1, 232

(56) References Cited

U.S. PATENT DOCUMENTS 5,055,249 * 10/1991 Schmid .......................... 264/236
5,223,584 * 6/1993 Lenke et al. ..................... 525/405

* cited by examiner

*Primary Examiner*—Duc Truong

(57) ABSTRACT

This invention is an improvement in standard polymerizations procedures, i.e., addition-type and step-growth type polymerizations, wherein momomers are reacted to form a growing polymer chain. The improvement includes employing an effective amount of a trifunctional monomer (such as a trifunctional amine, anhydride, or phenol) in the polymerization procedure to form a mixture of polymeric materials consisting of branced polymers, star-shaped polymers, and linear polymers. This mixture of polymeric materials has a lower melt temperature and a lower melt viscosity than corresponding linear polymeric materials of equivalent molecular weight.

9 Claims, 6 Drawing Sheets

Theoretical Structure
PEPAES n

METHOD OF PREPARING POLYMERS WITH LOW MELT VISCOSITY

This application is a continuation-in-part application of commonly owned patent application Ser. No. 08/622,176, filed Mar. 5, 1996, now abandoned.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to high performance polymeric materials. The present invention relates particularly to a series of poly(arylene ether)s (PAEs) that are useful as adhesives, composite matrices, moldings, films and coatings. The present invention also relates particularly to a series of polyimides (PIs) that are useful as adhesives, composite matrices, moldings, films and coatings.

DESCRIPTION OF RELATED ART

Poly(arylene ether)s (PAEs) are a class of high performance, aromatic polymers that display excellent thermal stability, good mechanical properties, good chemical resistance and good processability. Some commercially available PAEs include Udel Polysulfone (Amoco), PEEK Polyetheretherketone (ICI), PEK Polyetherketone (BASF) and PES Polyethersulfone. These materials have very good properties, but improvements need to be made in mechanical properties, chemical resistance and processability to take advantage of certain aerospace applications requiring high performance at relatively high temperatures for long times.

Some work has been reported that describes the preparation of PAEs with terminal and/or pendent reactive groups which improves mechanical properties and chemical resistance but the processing requirements still remain relatively high and, therefore, certain techniques to prepare composites are not available for these materials.

Polyimides (PIs) are a class of high performance, aromatic polymers that display excellent thermal stability, mechanical properties and chemical resistance but only fair processability. Overall, these materials have very good properties, but improvements need to be made in mechanical properties, chemical resistance and processability to take advantage of certain aerospace applications requiring high performance at relatively high temperatures for long times.

Some work has been reported that describes the preparation of PIs with terminal and/or pendent reactive groups which improves mechanical properties and chemical resistance but the processing requirements still remain relatively high and, therefore, certain techniques to prepare composites are not available for these materials.

A primary object of this invention is to provide polymers (PAEs and PIs) with lower melt viscosities [so that techniques such as Resin Transfer Molding (RTM) and Resin Film Infusion (RFI) can be used or so that lower pressures and/or temperatures can be used in autoclave processing], improved chemical resistance and improved mechanical properties.

Another object is to provide polymers (PAEs and PIs) with lower melting points, larger processing windows (time at the low viscosities), improved solubility (of the uncured form for materials containing reactive groups) and higher crosslink density in the cured polymer.

SUMMARY OF THE INVENTION

According to the present invention, PAEs and PIs were synthesized such that mixtures of branched, linear and star shaped molecules were obtained. Since the resulting material is a mixture of many different structures, some of which are branched and star shaped, the materials exhibit lower melting points as well as lower melt and solution viscosities than their linear counterparts. The lower melting point and lower melt viscosity provides a larger processing window. These materials are endcapped with either reactive endgroups which produce thermosets or on-reactive endgroups which produce thermoplastics. The synthesis of these mixtures of materials is accomplished by using a small amount of a trifunctional monomer (a bisphenol, for example 1,3,5-trihydroxybenzene, for PAEs or a triamine, for example triamino pyrimidine or melamine, for PIs), along with the conventional difunctional monomers in the polymerization. It is recognized that triamino pyrimidine and melamine are slow reacting triamines and, as a result, may produce lower molecular weight materials until higher temperatures are employed in synthesis or processing. This lower reactivity may, in fact, be very beneficial for certain types of processing which require low solution or melt viscosities. It is also recognized that the lower reactivity in one or more of the amine groups on the triamine could be used to control the final polymer architecture or ratio of linear to branched to star-shaped molecules. As long as the amount of trifunctional monomer is small, the materials remain only branched and therefore soluble. Higher concentrations of trifunctional monomer during synthesis would produce crosslinked, network systems which would be much less soluble. Solubility would be important if future processing techniques required solutions but would be unimportant in future processing techniques required only a melted system. Techniques such as RTM and RFI require a melted system with low melt viscosity and large processing windows (long times at low melt viscosities). As shown in Table 1, materials synthesized using small amounts of 1,3,5-trihydroxybenzene or triamino pyrimidine display lower melting points, lower melt and solution viscosities, and large processing windows. As shown in Table 2, materials synthesized using a small amount of triamino pyrimidine (Example 16) display higher glass transition temperatures ($T_g$s), higher tensile strengths and higher tensile moduli at both room temperature and 177° C. As shown in Table 3, these materials also display excellent adhesive strengths when bonded under mild conditions (Example 20).

The advantage of these non-reactive endcapped polymers to linear polymers is the lower melt viscosities at the same molecular weights thereby allowing other processing techniques such as RTM or RFI or lower pressures and temperatures with techniques such as autoclave processing. The advantage of these reactive endcapped polymers to linear reactive endcapped polymers of the same molecular weight is the lower melt viscosities before curing and the higher crosslink densities after curing (where branching in the uncured systems would become crosslinking in the cured systems) leading to improved chemical resistance and mechanical properties.

Tables have been added to report data on phenylethynyl terminated imide oligomers. Examples added on the synthesis and properties of the phenylethynyl terminated imide oligomers as follows. Designation relates to the monomers used and the theoretical molecular weight of the resulting oligomer.

DESCRIPTION OF THE PREFERRED EMBODIMENTS

Polymers terminated with reactive and non-reactive endgroups are readily prepared with a wide range of molecular weights (low to >50,000 g/mole) as mixtures of linear, branched and star shaped molecules by utilizing small amounts of a trifunctional monomer (a bisphenol, for example 1,3,5-trihydroxybenzene, for PAEs or a triamine, for example triamino pyrimidine, for PIs), along with the conventional difunctional monomers for the polymers.

Figure 1:
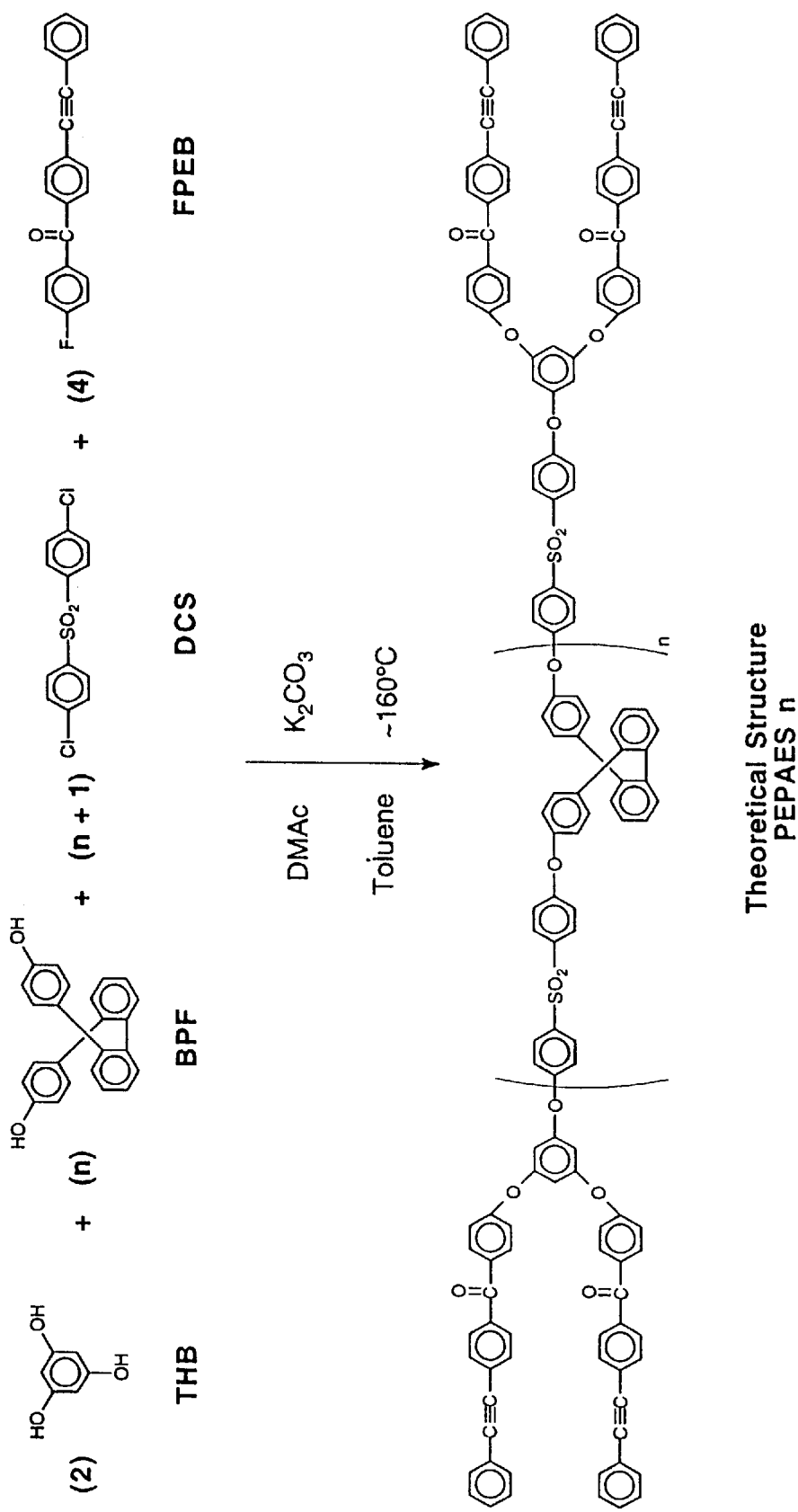
FIG. 1 is a schematic showing the preparation and theoretical structure of phenylethynyl poly(arylene ether) sulfones according to the present invention.
Figure 2:
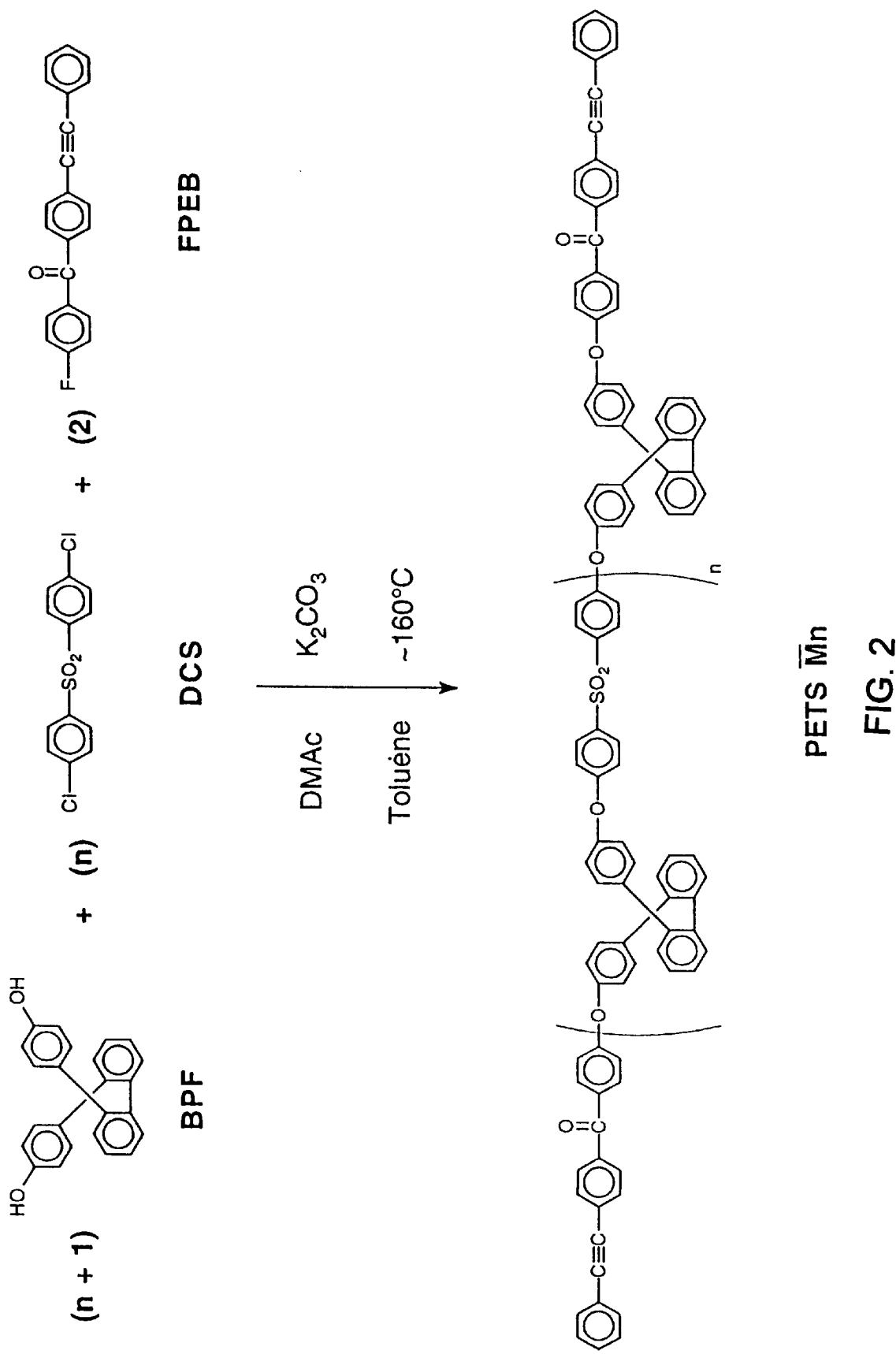
FIG. 2 is a schematic showing the preparation and theoretical structure of phenylethynyl terminated polysulfones according to the present invention.
Figure 3:
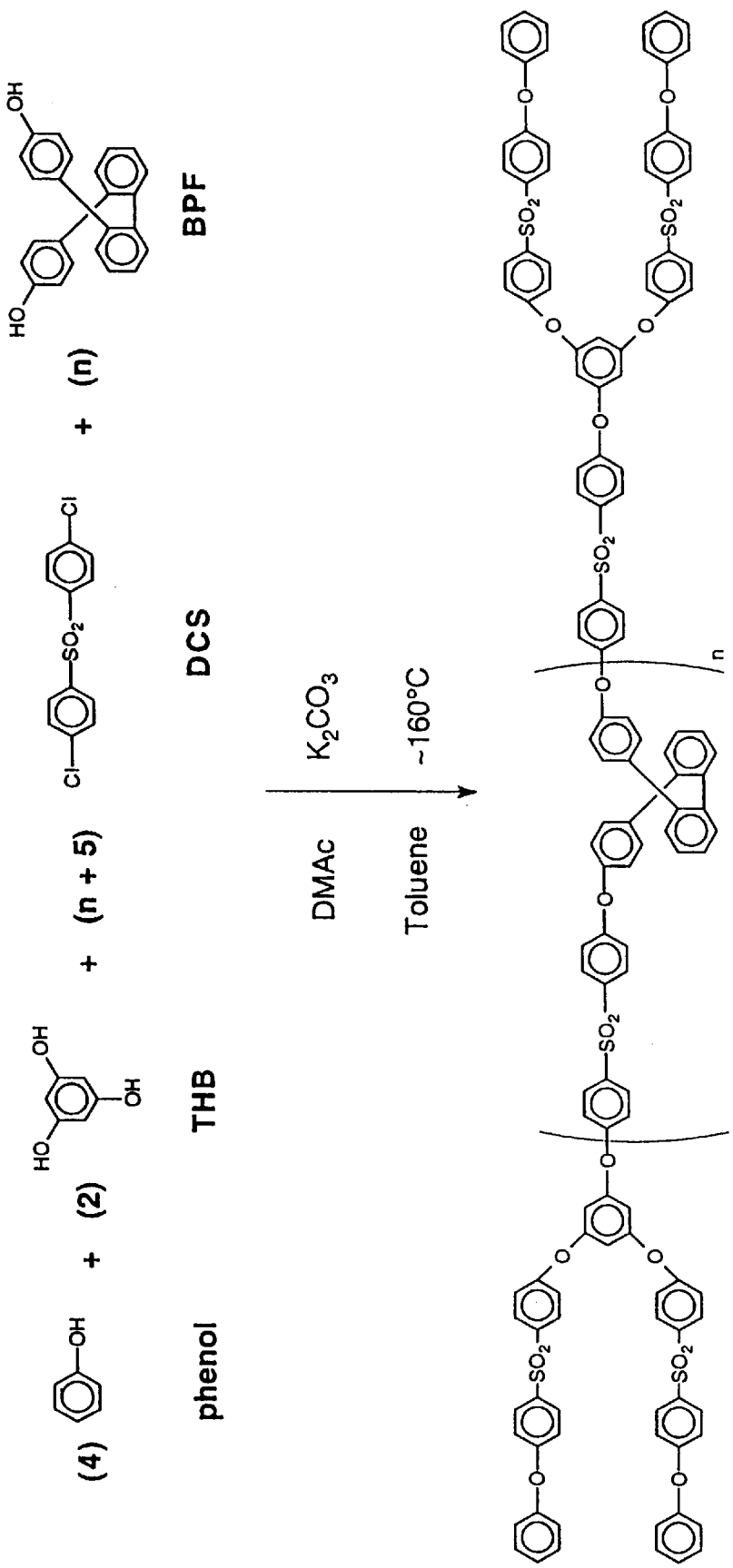
FIG. 3 is a schematic showing the preparation and theoretical structure of phenyl poly(arylene ether) sulfones according to the present invention.
Figure 4:
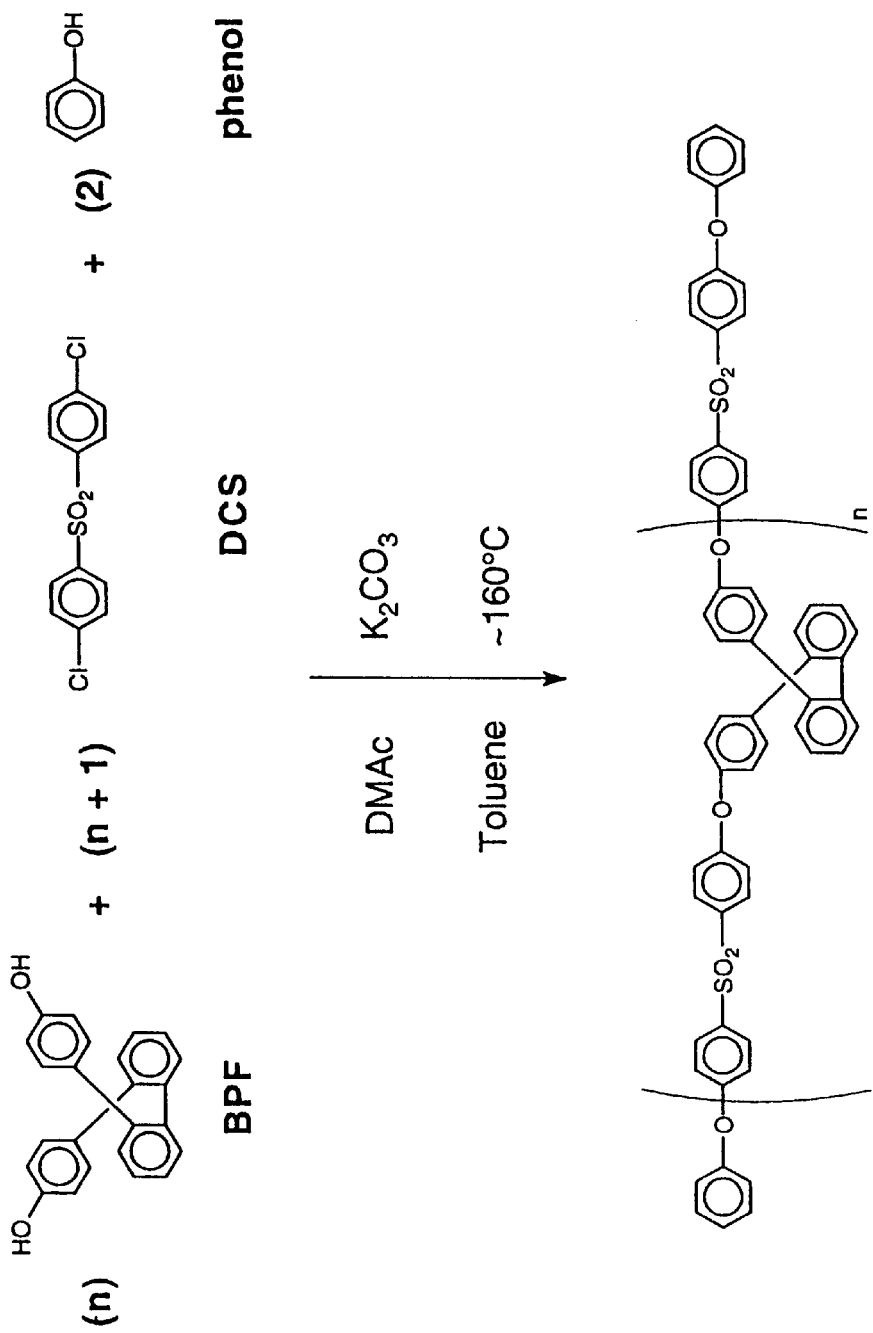
FIG. 4 is a schematic showing the preparation and theoretical structure of phenyl terminated polysulfone according to the present invention.
Figure 5:
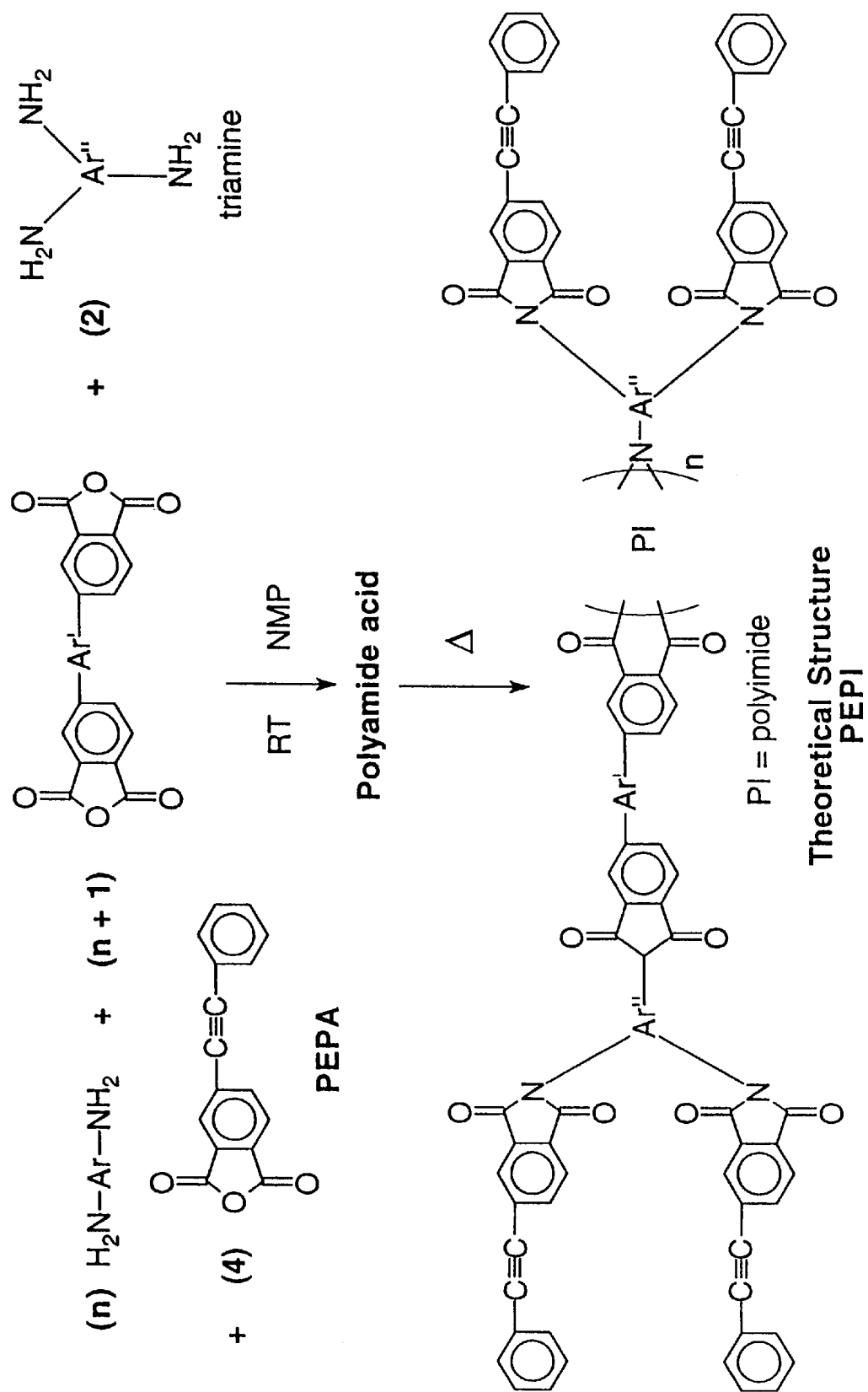
FIG. 5 is a schematic showing the preparation and theoretical structure of phenylethynyl polyimides according to the present invention.

Since these materials contain mixtures of various chemical structures, they have lower melting points, lower melt and solution viscosities and larger processing windows. Also, improvements in solubility are found where insoluble systems may become soluble or solutions of soluble systems can be made at a higher solids content. Therefore, processing techniques which are unsuccessful with linear materials are successful with these materials. Typically, RTM or RFI requires low melt viscosities to be both successful and economically viable. This synthetic technique provides a method to produce materials with low melt viscosities which have relatively high molecular weights. Changing the concentration of trifunctional monomer relative to the other monomers will increase or decrease the amount of branched and star shaped structures, thereby changing the viscosities as well as the crosslink density or branch density in the final cured or dried material. The poly(arylene ether)s are designated by PEPAE or PEPAES followed by a number. This stands for phenylethynyl poly(arylene ether) and phenylethynyl poly(arylene ether) sulfone, respectively. The number refers to the number of repeat units in the theoretical structure, as shown in the FIG. 1. Linear phenylethynyl terminated polysulfones were also prepared at the same molecular weights as the previously described branched materials for comparison purposes. These materials are designated PETS followed by a number corresponding to their theoretical number average molecular weights, as shown in the FIG. 2. Materials which are terminated with non-reactive phenyl groups were prepared in a branched version and are designated as PPAES for phenyl poly (arylene ether) sulfone followed by a number for the number of repeat units in the theoretical structure, as shown in the FIG. 3. Materials which are terminated with non-reactive phenyl groups were also prepared in a linear version and are designated as PTS for phenyl terminated polysulfone followed by a number corresponding to their theoretical number average molecular weights, as shown in the FIG. 4. The polyimides are designated by PETI for phenylethynyl terminated imide for the linear version and PEPI for phenylethynyl polyimide for the branched, star-shaped and linear mixtures, as shown in FIG. 5. Specific examples follow.

Conventionally, polymers are prepared by reacting difunctional monomers together to form high molecular weight, linear polymers. Monofunctional and trifunctional or higher functionality monomers are normally considered impurities because they lead to lower molecular weight or crosslinked and branched systems. Therefore, polymerization's utilizing monomers of the type A—A+B—B to yield polymers of the type -(A—A-B—B)$_n$- or polymerization's utilizing monomers of the type A-B to yield polymers of the type -(A-B)$_n$- are conventional. An exception is the use of monofunctional monomers to endcap the polymer at a desired, lower molecular weight to aid in processing. However, the addition of a small amount of trifunctional monomer will produce polymers with a limited amount of branched and/or star shaped polymers that provides a mixture of materials with lower melt temperatures and melt viscosities than corresponding linear materials of equivalent molecular weight. As long as a critical level of trifunctional monomer is not exceeded and a significant amount of crosslinks are not formed, the polymers will also remain soluble. Conventionally, polyimides are prepared by reacting diamines with dianhydrides to form linear poly(amide) acids which are subsequently converted either chemically or thermally to the corresponding polyimides. These would be an example of monomers of the type A—A+B—B to yield polymers of the type -(A—A-B—B)$_n$. However, the addition of a small amount of trifunctional amine or trifunctional anhydride will produce poly(amide) acids with a limited amount of branched and/or star shaped poly(amide) acids that provides a mixture of materials with lower melt temperatures and melt viscosities than corresponding linear materials of equivalent molecular weight. As long as a critical level of trifunctional monomer is not exceeded and a significant amount of crosslinks are not formed, these poly(amide) acids will also remain soluble. These poly (amide) acids are subsequently converted either chemically or thermally to the corresponding polyimides. It is recognized that the examples cited herein pertain to step-growth type polymerizations but it is considered that addition type polymerizations would have applicability as well.

EXAMPLE 1
Synthesis of PEPAE 1

The following example illustrates the synthesis of a phenylethynyl polyarylene ether with one repeat unit in the theoretical structure. 9,9-Bis(4-hydroxyphenyl)fluorene (BPF) (0.01 mole, 3.5042 g), 4,4'-difluorobenzophenone (DFB) (0.02 mole, 4.3641 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.088 mole, 12.16 g) were placed in a flask equipped with a mechanical stirrer, a Dean-Stark trap with condenser, thermometer and nitrogen inlet. N,N-Dimethylacetamide (DMAC) (68 ml) and toluene (40 ml) were added. The reaction was heated to ~160° C. and held at ~160° C. overnight to collect a water/toluene azeotropic mixture. In the morning the reaction mixture was poured

EXAMPLE 2
Synthesis of PEPAE 2

The following example illustrates the synthesis of a phenylethynyl polyarylene ether with two repeat units in the theoretical structure. 9,9-Bis(4-hydroxyphenyl)fluorene (BPF) (0.02 mole, 7.0084 g), 4,4'-difluorobenzophenone (DFB) (0.03 mole, 6.5462 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.11 mole, 15.2 g) were placed in a flask equipped with a mechanical stirrer, a Dean-Stark trap with condenser, thermometer and nitrogen inlet. N,N-Dimethylacetamide (DMAC) (70 ml) and toluene (40 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAE 2 in high yield.

EXAMPLE 3
Synthesis of PEPAE 4

The following example illustrates the synthesis of a phenylethynyl polyarylene ether with four repeat units in the theoretical structure. 9,9-Bis(4-hydroxyphenyl)fluorene (BPF) (0.02 mole, 7.0084 g), 4,4'-difluorobenzophenone (DFB) (0.025 mole, 5.4551 g), 1,3,5-trihydroxybenzene (THB) (0.01 mole, 1.2611 g), 4-fluoro-4'-phenylethynylbenzophenone (FPEB) (0.02 mole, 6.0067 g) and potassium carbonate (0.077 mole, 10.6 g) were placed in a flask equipped with a mechanical stirrer, a Dean-Stark trap with condenser, thermometer and nitrogen inlet. N,N-Dimethylacetamide (DMAC) (60 ml) and toluene (40 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAE 4 in high yield.

EXAMPLE 4
Synthesis of PEPAES 4

The following example illustrates the synthesis of a phenylethynyl polyarylene ether sulfone with four repeat units in the theoretical structure. 9,9-Bis(4-hydroxyphenyl)fluorene (BPF) (0.04 mole, 14.0168 g), 4,4'-dichlorodiphenyl sulfone (DCS) (0.05 mole, 14.3584 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.154 mole, 21.3 g) were placed in a flask equipped with a mechanical stirrer, a Dean-Stark trap with condenser, thermometer and nitrogen inlet. N,N-Dimethylacetamide (DMAC) (125 ml) and toluene (52 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAES 4 in high yield.

EXAMPLE 5
Synthesis of PEPAES 6

The following example illustrates the synthesis of a phenylethynyl polyarylene ether sulfone with six repeat units in the theoretical structure. 9,9-Bis(4-hydroxyphenyl)fluorene (BPF) (0.06 mole, 21.0253 g), 4,4'-dichlorodiphenyl sulfone (DCS) (0.07 mole, 20.1017 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.2 mole, 27.6 g) were placed in a flask equipped with a mechanical stirrer, a Dean-Stark trap with condenser, thermometer and nitrogen inlet. N,N-Dimethylacetamide (DMAC) (150 ml) and toluene (60 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAES 6 in high yield.

EXAMPLE 6
Synthesis of PEPAES 8

The following example illustrates the synthesis of a phenylethynyl polyarylene ether sulfone with eight repeat units in the theoretical structure. 9,9-Bis(4-hydroxyphenyl)fluorene (BPF) (0.08 mole, 28.0337 g), 4,4'-dichlorodiphenyl sulfone (DCS) (0.09 mole, 25.8450 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.242 mole, 33.5 g) were placed in a flask equipped with a mechanical stirrer, a Dean-Stark trap with condenser, thermometer and nitrogen inlet. N,N-Dimethylacetamide (DMAC) (175 ml) and toluene (60 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAES 8 in high yield.

EXAMPLE 7
Synthesis of PEPAES 10

The following example illustrates the synthesis of a phenylethynyl polyarylene ether sulfone with ten repeat units in the theoretical structure. 9,9-Bis(4-hydroxyphenyl)fluorene (BPF) (0.10 mole, 35.0421 g), 4,4'-dichlorodiphenyl sulfone (DCS) (0.11 mole, 31.5884 g), 1,3,5-trihydroxybenzene (THB) (0.02 mole, 2.5223 g), 4-fluoro-4'-phenylethynylbenzophenone (FPEB) (0.04 mole, 12.0134 g) and potassium carbonate (0.286 mole, 39.5 g) were placed in a flask equipped with a mechanical stirrer, a Dean-Stark trap with condenser, thermometer and nitrogen inlet. N,N-Dimethylacetamide (DMAC) (145 ml) and toluene (45 ml) were added. The reaction was heated to ~160° C. and held at 160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAES in high yield.

EXAMPLE 8
Synthesis of PEPAES 15

The following example illustrates the synthesis of a phenylethynyl polyarylene ether sulfone with 15 repeat units in the theoretical structure. 9,9-lBis(4-hydroxyphenyl)

fluorene (BPF) (0.075 mole, 26.2816 g), 4,4'-dichlorodiphenyl sulfone (DCS) (0.08 mole, 22.9734 g), 1,3,5-trihydroxybenzene (THB) (0.01 mole, 1.2611 g), 4-fluoro-4'-phenylethynylbenzophenone (FPEB) (0.02 mole, 6.0067 g) and potassium carbonate (0.2 mole, 27.6 g) were placed in a flask equipped with a mechanical stirrer, a Dean-Stark trap with condenser, thermometer and nitrogen inlet. N,N-Dimethylacetamide (DMAC) (150 ml) and toluene (40 ml) were added. The reaction was heated to '1 600C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PEPAES in high yield.

EXAMPLE 9
Synthesis of PETS 4976

The following example illustrates the synthesis of a linear phenylethynyl terminated polyarylene ether sulfone with a theoretical number average molecular weight of 4976 g/mole. 9,9-Bis(4-hydroxy-phenyl)fluorene (BPF) (0.03 mole, 10.5126 g), 4,4'-dichlorodiphenyl sulfone (DCS) (0.02639 mole, 7.5786 g),4-fluoro-4'-phenylethynylbenzophenone (FPEB) (7.22 mmole, 2.1684 g) and potassium carbonate (0.066 mole, 9.12 g) were placed in a flask equipped with a mechanical stirrer, a Dean-Stark trap with condenser, thermometer and nitrogen inlet. N,N-Dimethylacetamide (DMAC) (80 ml) and toluene (50 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PETS 4976 in high yield.

EXAMPLE 10
Synthesis of PETS 6105

The following example illustrates the synthesis of a linear phenylethynyl terminated polyarylene ether sulfone with a theoretical number average molecular weight of 6105 g/mole. 9,9-Bis(4-hydroxyphenyl)fluorene (BPF) (0.03 mole, 10.5126 g), 4,4'-dichlorodiphenyl sulfone (DCS) (0.02710 mole, 7.7802 g), 4-fluoro-4'-phenylethynylbenzophenone (FPEB) (5.80 mmole, 1.7419 g) and potassium carbonate (0.066 mole, 9.12 g) were placed in a flask equipped with a mechanical stirrer, a Dean-Stark trap with condenser, thermometer and nitrogen inlet. N,N-Dimethylacetamide (DMAC) (80 ml) and toluene (50 ml) were added. The reaction was heated to ~160° C. and held at 160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for 16 hours to afford PETS 6105 in high yield.

EXAMPLE 11
Synthesis of PETS 7235

The following example illustrates the synthesis of a linear phenylethynyl terminated polyarylene ether sulfone with a theoretical number average molecular weight of 7235 g/mole. 9,9-Bis(4-hydroxy-phenyl)fluorene (BPF) (0.05 mole, 17.5211 g), 4,4'-dichlorodiphenyl sulfone (DCS) (0.045935 mole, 13.1910 g), 4-fluoro-4'-phenylethynylbenzophenone (FPEB) (8.13 mmole, 2.4417 g) and potassium carbonate (0.11 mole, 15.2 g) were placed in a flask equipped with a mechanical stirrer, a Dean-Stark trap with condenser, thermometer and nitrogen inlet. N,N-Dimethylacetamide (DMAC) (100 ml) and toluene (50 ml) were added. The reaction was heated to ~160° C. and held at 160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PETS 7235 in high yield.

EXAMPLE 12
Synthesis of PETS 10058

The following example illustrates the synthesis of a linear 5 phenylethynyl terminated polyarylene ether sulfone with a theoretical number average molecular weight of 10,058 g/mole. 9,9-Bis(4-hydroxy-phenyl)fluorene (BPF) (0.05 mole, 17.5211 g), 4,4'-dichlorodiphenyl sulfone (DCS) (0.047115 mole, 13.5299 g), 4-fluoro-4'-phenylethynylbenzophenone (FPEB) (5.77 mmole, 1.7329 g) and potassium carbonate (0.11 mole, 15.2 g) were placed in a flask equipped with a mechanical stirrer, a Dean-Stark trap with condenser, thermometer and nitrogen inlet. N,N-Dimethylacetamide (DMAC) (100 ml) and toluene (50 ml) were added. The reaction was heated to 160° C. and held at 160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PETS 10058 in high yield.

EXAMPLE 13
Synthesis of PTS 10058

The following example illustrates the synthesis of a linear phenyl terminated polyarylene ether sulfone with a theoretical number average molecular weight of 10,058 g/mole. 9,9-Bis(4-hydroxyphenyl)fluorene (BPF) (0.028332 mole, 9.9281 g), 4,4'-dichlorodiphenyl sulfone (DCS) (0.03 mole, 8.6150 g), phenol (3.336 mmole, 0.3140 g) and potassium carbonate (0.08 mole, 11 g) were placed in a flask equipped with a mechanical stirrer, a Dean-Stark trap with condenser, thermometer and nitrogen inlet. N,N-Dimethylacetamide (DMAC) (54 ml) and toluene (40 ml) were added. The reaction was heated to 160° C. and held at 160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PTS 10058 in high yield.

EXAMPLE 14
Synthesis of PPAES 15

The following example illustrates the synthesis of a phenyl polyarylene ether sulfone with repeat units in the theoretical structure. 9,9-bis(4-hydroxyphenyl)fluorene (BPF) (0.02861 mole, 10.0255 g), 4,4'-dichlorodiphenyl sulfone (DCS) (0.03061 mole, 11.0875 g), 1,3,5-trihydroxybenzene (THB) (0.004 mole, 0.5045 g), phenol (0.008 mole, 0.7529 g) and potassium carbonate (0.176 mole, 24.3 g) were placed in a flask equipped with a mechanical stirrer, a Dean-Stark trap with condenser, thermometer and nitrogen inlet. N,N-Dimethylacetamide (DMAC) (65 ml) and toluene (40 ml) were added. The reaction was heated to ~160° C. and held at ~160° C. overnight to collect a water/toluene azeotropic mixture. In the morning the reaction mixture was poured into an acetic acid/water (~10%) mixture in a blender to precipitate an off white solid. This solid was washed with water in the blender then dried at 100° C. for ~16 hours to afford PPAES 15 in high yield.

EXAMPLE 15
Synthesis of PETI 5496

The following represents the synthesis of a linear phenylethynyl terminated polyimide copolymer with theoretical number average molecular weight of 5496 g/mol. 3,4'-Oxydianiline (ODA) (1.700 mole, 340.42 g), 1,3-bis(3-aminophenoxy)benzene (APB) (0.300 mole, 87.70 g), 3,3', 4,4'-biphenyl tetracarboxylic dianhydride (BPDA) (1.8196 mole, 535.37 g), 4-phenylethnynyl phthalic anhydride (PEPA) (0.3608 mole, 89.57 g), N-methylpyrollidinone (NMP) (1580 g) were added to a 3 L reaction kettle equipped with a mechanical stirrer, condenser and nitrogen inlet. The reaction was stirred at 25° C. for 16 hours to form the phenylethynyl terminated polyamide acid ($\eta_{inh}$=0.29 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 hours to afford a yellow solid in >95% yield. The resulting phenylethynyl terminated polyimide powder was insoluble in NMP at 25° C. The final Tg of 263° C. was measured after one hour at 371° C. A portion of powder was dried at 240° C. for two and one-half hours under vacuum for molding. The material (1.5 g) was molded at 150 psi and 371° C. for one hour displaying excellent processability with no voids and good molding flash. The yellow precipitate was insoluble in NMP after drying at 110° C.

EXAMPLE 16
Synthesis of PEPI 5496

The following represents the synthesis of a mixture of branched, star shaped and linear phenylethynyl terminated polyimide copolymer with theoretical number average molecular weight of 5496 g/mol. 3,4'-Oxydianiline (ODA) (22.86 mmole, 4.5776 g), 1,3-bis(3-amino-phenoxy) benzene (APB) (4.0341 mmole, 1.1793 g), 3,3', 4,4'-biphenyl tetracarboxylic dianhydride (BPDA) (30.00 mmole, 8.8267 g), 4-phenylethnynyl phthalic anhydride (PEPA) (12.425 mmole, 3.0843 g), triaminopyrimidine (TAP) (6.2124 mmol, 0.7774 g), N-methylpyrollidinone (NMP) (73.8 g) were added to a 250 ml reaction kettle equipped with a mechanical stirrer, condenser and nitrogen inlet. The reaction was stirred at 25° C. for 16 hours to form the phenylethynyl terminated polyamide acid ($\eta_{inh}$=0.15 dL/g, NMP at 250C.) followed by adding toluene (40 mL) and heating at 160° C. for 24 h. The polymer remained soluble during the heating. After cooling, the high viscosity solution was poured into water, washed in boiling methanol and dried at 110° C. for 72 hours to afford a yellow solid in >95% yield. The resulting phenylethynyl terminated polyimide powder was soluble in NMP. The final Tg of 291° C. was measured after one hour at 371° C. A portion of powder was dried at 240° C. for two and one-half hours under vacuum for molding. The material (1.5 g) was molded at 50 psi and 371° C. for one hour displaying too much flow with all the polymer squeezing out of the mold. When molded at 15 psi and 371° C. for one hour, the results were the same. Even when pressure from the mold plunger only (~1 psi) was used, the material displayed too much flow with all the polymer squeezing out of the mold. The yellow solid dried at 110° C. was still soluble in NMP up to ~20% solids content.

EXAMPLE 17
Synthesis of PEPI 7500

The following represents the synthesis of a mixture of branched, star shaped and linear phenylethynyl terminated polyimide copolymer with theoretical number average molecular weight of 7500 g/mol. 3,4'-Oxydianiline (ODA) (23.665 mmole, 4.7388 g), 1,3-bis(3-aminophenoxy) benzene (APB) (4.1762 mmole, 1.2208 g), 3,3', 4,4'-biphenyl tetracarboxylic dianhydride (BPDA) 30.00 mmole, 8.8267 g), 4-phenylethnynyl phthalic anhydride (PEPA) (8.636 mmole, 2.1438 g), triaminopyrimidine (TAP) (4.318 mmole, 0.5404 g), N-methylpyrollidinone (NMP) (69.9 g) were added to a 250 ml reaction kettle equipped with a mechanical stirrer, condenser and nitrogen inlet. The reaction was stirred at 25° C. for 16 hours to form the phenylethynyl terminated polyamide acid ($\eta_{inh}$0.16 dL/g, NMP at 25° C.) followed by adding toluene (40 mL) and heating at 160° C. for 24 hours. The polymer remained soluble during the heating. After cooling, the high viscosity solution was poured into water, washed in boiling methanol and dried at 110° C. for 72 hours to afford a yellow solid in >95% yield. The resulting phenylethynyl terminated polyimide powder was soluble in NMP. The final Tg of 279° C. was measured after one hour at 371° C. A portion of powder was dried at 240° C. for two and a half hours under vacuum for molding. The material (1.5 g) was molded at 50 psi and 371° C. for one hour displayed excellent flow with significant flash. The yellow solid dried at 110° C. was still soluble in warmed NMP.

EXAMPLE 17a
APB/BPDA 1266

Figure 6:
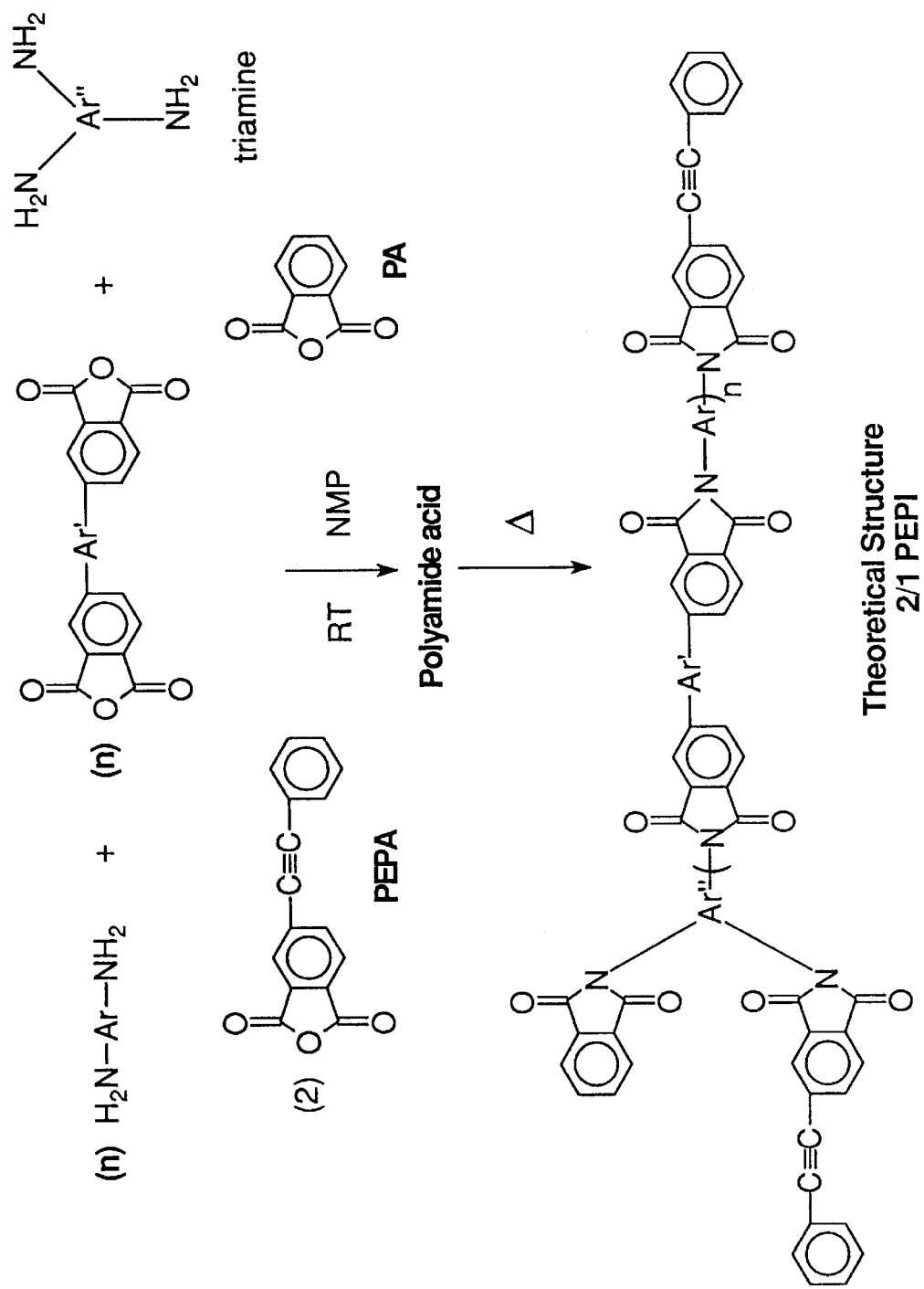
FIG. 6 is a schematic showing the preparation and theoretical structure of phenylethynyl containing imide oligomers according to the present invention. The designation relates to the ratio of phenylethynyl phthalic anhydride (PEPA) to phthalic anhydride (PA) and phenylethynyl polyimide (PEPI).

The following represents the synthesis of a mixture of branched, star shaped and linear phenylethynyl terminated imide oligomer with theoretical number average molecular weight of 1266 g/mol as shown in FIG. 6 where n=1. 1,3-Bis(3-aminophenoxy)benzene (APB) (10.0 mmole, 2.9233 g), 3,3', 4,4'-biphenyltetracarboxylic dianhydride (BPDA) (10.00 mmole, 2.9422 g), 4-phenylethynyl phthalic anhydride (PEPA) (20.0 mmole, 4.9648 g), triaminopyrimidine (TAP) (10.0 mmol, 1.2514 g), phthalic anhydride (PA) (10.0 mmole, 1.4812 g), and N-methylpyrollidinone (NMP) (~40 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark at 165° C. for 24 h. The oligomer remained soluble during the heating. After cooling, the low viscosity solution was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial broad melting point was detected peaking at 132° C. The final Tg was not detected after heating 1 h at 371° C. indicating a high crosslink density. A portion of glassy solid pulvarized into a powder was placed between cover slips and heated on a Fisher-Johns melting point apparatus under slight pressure from a spatula tip. The powder melted and cleared to a liquid at 145–155° C. The minimum melt viscosity was below the measurement capability of the Rheometrics System IV rheometer indicating a viscosity significantly less than 50 poise at ~250° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17b
APB/BPDA 1817

The following represents the synthesis of a mixture of branched, star shaped and linear phenylethynyl terminated imide oligomer with theoretical number average molecular weight of 1817 g/mol as shown in FIG. 6 where n=2. 1,3-Bis(3-aminophenoxy)benzene (APB) (20.0 mmole, 5.8467 g), 3,3', 4,4'-biphenyltetracarboxylic dianhydride (BPDA) (20.00 mmole, 5.8845 g), 4-phenylethynyl phthalic anhydride (PEPA) (20.0 mmole, 4.9648 g), triaminopyrimidine (TAP) (10.0 mmol, 1.2514 g), phthalic anhydride (PA) (10.0 mmole, 1.4812 g), and N-methylpyrollidinone (NMP) (~60 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark at 165° C. for 24 h. The oligomer remained soluble during the heating. After cooling, the low viscosity solution was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial Tg was detected at 134° C. The final Tg was 232° C. after heating 1 h at 371° C. A portion of glassy solid pulvarized into a powder was placed between cover slips and heated on a Fisher-Johns melting point apparatus under slight pressure from a spatula tip. The powder melted and cleared to a liquid at 150–165° C. The minimum melt viscosity was below the measurement capability of the Rheometrics System IV rheometer indicating a viscosity significantly less than 50 poise at ~260° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17c
APB/BPDA 2367

The following represents the synthesis of a mixture of branched, star shaped and linear phenylethynyl terminated imide oligomer with theoretical number average molecular weight of 2367 g/mol as shown in FIG. 6 where n=3. 1,3-Bis(3-aminophenoxy)benzene (APB) (30.0 mmole, 8.7700 g), 3,3', 4,4'-biphenyltetracarboxylic dianhydride (BPDA) (30.00 mmole, 8.8267 g), 4-phenylethynyl phthalic anhydride (PEPA) (20.0 mmole, 4.9648 g), triaminopyrimidine (TAP) (10.0 mmol, 1.2514 g), phthalic anhydride (PA) (10.0 mmole, 1.4812 g), and N-methylpyrollidinone (NMP) (~60 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h. The oligomer remained soluble during the heating. After cooling, the low viscosity solution was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial Tg was detected at 150° C. The final Tg was 219° C. after heating 1 h at 371° C. A portion of glassy solid pulvarized into a powder was placed between cover slips and heated on a Fisher-Johns melting point apparatus under slight pressure from a spatula tip. The powder melted and cleared to a liquid at 175–185° C. The minimum melt viscosity was below the measurement capability of the Rheometrics System IV rheometer indicating a viscosity significantly less than 50 poise at ~270° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17d
APB/BPDA 2918

The following represents the synthesis of a mixture of branched, star shaped and linear phenylethynyl terminated imide oligomer with theoretical number average molecular weight of 2918 g/mol as shown in FIG. 6 where n=4. 1,3-Bis(3-aminophenoxy)benzene (APB) (40.0 mmole, 11.6934 g), 3,3', 4,4'-biphenyltetracarboxylic dianhydride (BPDA) (40.00 mmole, 11.7690 g), 4-phenylethynyl phthalic anhydride (PEPA) (20.0 mmole, 4.9648 g), triaminopyrimidine (TAP) (10.0 mmol, 1.2514 g), phthalic anhydride (PA) (10.0 mmole, 1.4812 g), and N-methylpyrollidinone (NMP) (~75 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h. The oligomer remained soluble during the heating. After cooling, the low viscosity solution was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial Tg was detected at 155° C. The final Tg was 213° C. after heating 1 h at 371° C. A portion of glassy solid pulvarized into a powder was placed between cover slips and heated on a Fisher-Johns melting point apparatus under slight pressure from a spatula tip. The powder melted and cleared to a liquid at 185–195° C. The minimum melt viscosity was below the measurement capability of the Rheometrics System IV rheometer indicating a viscosity significantly less than 50 poise at ~280° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17e
pPDA/PMDA 1006

The following represents the synthesis of a mixture of branched, star shaped and linear phenylethynyl terminated imide oligomer with theoretical number average molecular weight of 1006 g/mol as shown in FIG. 6 where n=1. p-Phenylene diamine (pPDA) (20.0 mmole, 2.1625 g), pyromellitic dianhydride (PMDA) (20.00 mmole, 4.3624 g), 4-phenylethynyl phthalic anhydride (PEPA) (40.0 mmole, 9.9296 g), triaminopyrimidine (TAP) (20.0 mmol, 2.5028 g), phthalic anhydride (PA) (20.0 mmole, 2.9638 g), and N-methylpyrollidinone (NMP) (~50 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h to form a yellow precipitate. After cooling, the reaction mixture was poured into water to produce an off-white solid. The solid was washed in water and dried at 200° C. for 1–2 h under vacuum to afford a light yellow solid in >95% yield. The resulting phenylethynyl terminated imide oligomer was insoluble in NMP. No Tg was detected during initial heat-up to 371° C. or after 1 h at 371° C. A portion of the powder was placed between cover slips and heated on a Fisher-Johns melting point apparatus under slight pressure from a spatula tip. The powder never melted or cleared after heating to 325° C. The sample remained solid-like when heated in the Rheometrics System IV rheometer up to a temperature of 371° C. indicating no flow whatsoever. The diamine and dianhydride utilized in this example produce an extremely rigid polyimide which eliminates the ability of the material to flow even though a mixture of structures has been prepared. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17f
pPDA/PMDA 1296

The following represents the synthesis of a mixture of branched, star shaped and linear phenylethynyl terminated imide oligomer with theoretical number average molecular weight of 1296 g/mol as shown in FIG. 6 where n=2. p-Phenylene diamine (pPDA) (40.0 mmole, 4.3250 g), pyromellitic dianhydride (PMDA) (40.00 mmole, 8.7249 g), 4-phenylethynyl phthalic anhydride (PEPA) (40.0 mmole, 9.9296 g), triaminopyrimidine (TAP) (20.0 mmol, 2.5028 g), phthalic anhydride (PA) (20.0 mmole, 2.9638 g), and N-methylpyrollidinone (NMP) (~50 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h to form a precipitate. After cooling, the reaction mixture was poured into water to produce an off-white solid. The solid was washed in water and dried at 200° C. for 1–2 h under vacuum to afford a light yellow solid in >95% yield. The resulting phenylethynyl terminated imide oligomer was insoluble in NMP. No Tg was detected during initial heat-up to 371° C. or after 1 h at 371° C. A portion of the powder was placed between cover slips and heated on a Fisher-Johns melting point apparatus under slight pressure from a spatula tip. The powder never melted or cleared after heating to 325° C. The sample remained solid-like when heated in the Rheometrics System IV rheometer up to a temperature of 371° C. indicating no flow whatsoever. The diamine and dianhydride utilized in this example produce an extremely rigid polyimide which eliminates the ability of the material to flow even though a mixture of structures has been prepared. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17g
APB/PMDA 1190

The following represents the synthesis of a mixture of branched, star shaped and linear phenylethynyl terminated imide oligomer with theoretical number average molecular weight of 1190 g/mol as shown in FIG. 6 where n=1. 1,3-Bis(3-aminophenoxy)benzene (APB) (30.0 mmole, 8.7700 g), pyromellitic dianhydride (PMDA) (30.00 mmole, 6.5436 g), 4-phenylethynyl phthalic anhydride (PEPA) (60.0 mmole, 14.8944 g), triaminopyrimidine (TAP) (30.0 mmol, 3.7542 g), phthalic anhydride (PA) (30.0 mmole, 4.4436 g), and N-methylpyrollidinone (NMP) (~90 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h to form a precipitate. After cooling, the reaction mixture was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial broad melting point was detected peaking at 131° C. The final Tg was not detected after heating 1 h at 371° C. indicating a high crosslink density. A portion of glassy solid pulverized into a powder was placed between cover slips and heated on a Fisher-Johns melting point apparatus under slight pressure from a spatula tip. The powder melted and cleared to a liquid at 140–150° C. The minimum melt viscosity was below the measurement capability of the Rheometrics System IV rheometer indicating a viscosity significantly less than 50 poise at ~240° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

EXAMPLE 17h

APB/PMDA 1665

The following represents the synthesis of a mixture of branched, star shaped and linear phenylethynyl terminated imide oligomer with theoretical number average molecular weight of 1665 g/mol as shown in FIG. 6 where n=2. 1,3-Bis(3-aminophenoxy)benzene (APB) (60.0 mmole, 17.5400 g), pyromellitic dianhydride (PMDA) (60.00 mmole, 13.0872 g), 4-phenylethynyl phthalic anhydride (PEPA) (60.0 mmole, 14.8944 g), triaminopyrimidine (TAP) (30.0 mmol, 3.7542 g), phthalic anhydride (PA) (30.0 mmole, 4.4436 g), and N-methylpyrollidinone (NMP) (~100 mL) were added to a 250 mL reaction kettle equipped with a mechanical stirrer, condenser and nitrogen inlet. The reaction was stirred at 25° C. for 4–16 h to form the phenylethynyl terminated amide acid oligomer followed by adding toluene (40 mL) and heating under a Dean-Stark trap at 165° C. for 24 h to form a precipitate. After cooling, the reaction mixture was poured into water to produce an off-white solid. The solid was washed in water and dried at 200° C. for 1–2 h under vacuum (melted during drying) to afford a light amber glassy solid in >95% yield. The resulting phenylethynyl terminated imide oligomer was soluble in NMP. An initial Tg was detected at 135° C. The final Tg was not detected after heating 1 h at 371° C. indicating a high crosslink density. A portion of glassy solid pulvarized into a powder was placed between cover slips and heated on a Fisher-Johns melting point apparatus under slight pressure from a spatula tip. The powder melted and cleared to a liquid at 150–160° C. The minimum melt viscosity was below the measurement capability of the Rheometrics System IV rheometer indicating a viscosity significantly less than 50 poise at ~250° C. Like previous examples herein, a mixture of linear, branched and star shaped molecules can form because of the trifunctional monomer. In addition, the use of some phthalic anhydride along with the phenylethynyl phthalic anhydride (in this case a 2:1 ratio of PEPA to PA) provides an additional method to produce a mixture of molecules whose "average" or theoretical structure is represented in FIG. 6. That is, some molecules may have three PEPA monomers incorporated into the structure while others may have two molecules of PA incorporated into the structure, and so on. Furthermore, higher ratios of PEPA to PA would produce higher crosslink density in the cured material while lower ratios would produce lower crosslink density.

| DATA FOR PHENYLETHYNYL TERMINATED IMIDE OLIGOMERS | | | | | |
|---|---|---|---|---|---|
| Material | Theoretical Repeat Units | Molecular Weight, g/mole | Initial Tg (Tm), ° C. | [a]Cure d Tg, ° C. | Minimum Melt Viscosity, poise |
| Repeat unit based on 1,3-(3-aminophenoxy benzene) (APB) and biphenyltetracarboxylic dianhydride (BPDA). | | | | | |
| [d]APB/BPDA 1266 | 1 | 1266 | (130) | [b]ND | <50 @~250° C. |
| APB/BPDA 1817 | 2 | 1817 | 134 | 232 | <50 @~260° C. |
| APB/BPDA 2367 | 3 | 2367 | 150 | 219 | <50 @~270° C. |
| APB/BPDA 2918 | 4 | 2918 | 155 | 213 | <50 @~280° C. |
| Repeat unit based on 1,3-(3-aminophenoxy benzene) (APB) and pyromellitic dianhydride (PMDA). | | | | | |
| [d]APB/PMDA 1190 | 1 | 1190 | (131) | [b]ND | <50 @~240° C. |
| APB/PMDA 1665 | 2 | 1665 | 135 | [b]ND | <50 @~250° C. |
| Repeat unit based on p-phenylene diamine (pPDA) and pyromellitic dianhydride (PMDA). | | | | | |
| pPDA/PMDA 1006 | 1 | 1006 | [b]ND | [b]ND | no flow to 371° C., remained semi-solid like |
| pPDA/PMDA 1296 | 2 | 1296 | [b]ND | [b]ND | no flow to 371° C., remained semi-solid like |

[a]Cured 1 hour at 371° C. in DSC.
[b]Not Detected.

EXAMPLE 18
Preparation of Moldings

The following process was used to test the compression moldability of the aforementioned examples. Dried powders of the materials (1 to 1.5 gram) were placed in a 1.25 inch square stainless steel mold which was placed in a preheated hydraulic press. The molds were heated through an appropriate cycle to 350 to 371° C. under pressure. The pressure and temperature were held constant for one hour to provide a cured product. The materials displayed excellent flow and processability.

EXAMPLE 19
Preparation of Adhesive Tape

Solutions of the materials were used to prepare adhesive tapes as follows. The solutions were applied to style 112, A1100 finish E-glass cloth which was dried for 0.5 hours in a forced air oven at 100° C. Said coated cloths were air dried one hour each at 100° C. and 175° C. and 0.5 hours at 225° C. between application of subsequent coats. This procedure was continued until a nominal thickness of 0.012 inch was obtained. The area to be bonded was coated (primed) on each adherend with a dilute solution (~5% solids) of the same composition as the adhesive tape and air dried one hour each at 100° C. and 175° C. and 0.5 hours at 225° C. prior to bonding with the adhesive tape.

EXAMPLE 20
Adhesive Bonding

The prepared adhesive tapes were cut into strips sufficient to cover the bond area so as to give a 0.5 inch overlap for surface-treated (Pasa Jell 107) titanium alloy (Ti-6A1-4V) four fingered panel adherends. Each tape was placed between the overlapped panels and the specimens were assembled in a bonding jig in such a manner as to hold the specimens securely while being bonded. The assembly was placed in a hydraulic press and pressure was applied. The temperature, monitored by a thermocouple, was increased from room temperature to 288 to 371° C. and held for one hour while pressure was maintained. The heat was turned off and the press was allowed to cool under pressure to <150° C. The bonded panel was removed from the press and jig and the individual specimens were separated with a metal shearer. The lap shear strengths were determined according to the procedure for ASTM-1002. The results are summarized in Table 3.

EXAMPLE 21
Preparation of Graphite Fiber with Polymer Coating

A solution of the materials was coated onto continuous graphite fiber (Hercules, Inc., IM-7). After coating, the wet fiber was dried in ovens to remove most of the solvent. The polymer-solids-to-graphite-fiber ratio was approximately one to two. This prepreg was held for composite fabrication.

EXAMPLE 22
Preparation of Graphite Fiber Reinforced Composite

The prepreg was cut into three inch square pieces and placed in a three inch by three inch matched-metal-die mold with the fiber all aligned in the same direction (unidirectional). Twelve plies of the prepreg were stacked in this manner and the mold was placed in a heated hydraulic press. The mold was heated through an appropriate cycle to 350 to 371° C. under pressure and held for one hour at 350 to 371° C. After cooling to ambient conditions, the pressure was released and a well consolidated composite part was removed from the mold. The resin content of the molded composite was calculated to be approximately 33 percent.

EXAMPLE 23
Measurement of Melt Viscosity and Melt Stability

The materials were subjected to melt rheology measurements using the Rheometrics System IV rheometer and/or the Brabender equipped with a Mixer Measuring Head. Both techniques indicate that these copolymers have low melt viscosities and excellent melt stabilities when heated to and held at the temperatures necessary to process into useful parts. For the Brabender data, torque is a measure of the force needed to mix the polymers and is directly related to viscosity at the temperatures shown.

EXAMPLE 24
Preparation of Glass Coating

The polymer solutions were poured onto glass plates and spread to a uniform thickness using a doctors blade with a preset gap. After drying to a tack free form in a dust free atmosphere, the polymers were heated to form a coating with high adhesion to the glass plate.

EXAMPLE 25
Preparation of Wire Coating

Steel and copper wires were dipped into the solutions and removed to form a polymer/solvent coating on the wires. After drying to a tack free form in a dust free atmosphere, the polymers were heated to form a tough, flexible coating with high adhesion to the steel or copper wire.

TABLE 1

| Polymer | Calculated $M_n$, g/mole | $\eta_{inh}$, dL/g | Initial DSC $T_g$, °C. (Tm) | Final DSC $T_g$, °C. (Tm) (after 371° C., one hour cure) | Rheometer Melt Temp., °C. | Melt Viscosity, poise |
|---|---|---|---|---|---|---|
| Example 1 PEPAE 1 | 2080 | | (~134) | ND (325) | 140 | >10 |
| Example 2 PEPAE 2 | 2609 | | 66 (198) | 213 (325) | ~120 | <10 |
| Example 3 PEPAE 4 | 3666 | | 78 (231) | 190 | ~130 | |
| Example 4 PEPAES 4 | 3847 | | (130) | 210 | ~165 | ~0.1* |
| Example 5 PEPAES 6 | 4976 | 0.052 | (128) | 216 | ~140 | <10 |
| Example 9 PETS 4976 | 4976 | 0.092 | 208 | 239 | ~260 | >10 |
| Example 6 PEPAES 8 | 6105 | 0.054 | (145) | 215 | ~180 | ~0.2* |
| Example 10 PETS 6105 | 6105 | 0.097 | 218 | 238 | ~265 | >10 |
| Example 7 PEPAES 10 | 7235 | 0.067 | (158) | 194 | ~190 | ~0.3* |

TABLE 1-continued

| Polymer | Calculated $M_n$, g/mole | $\eta_{inh}$, dL/g | Initial DSC $T_g$, °C. (Tm) | Final DSC $T_g$, °C. (Tm) (after 371° C., one hour cure) | Rheometer Melt Temp., °C. | Melt Viscosity, poise |
|---|---|---|---|---|---|---|
| Example 11 PETS 7235 | 7235 | 0.116 | | 244 | ⁻275 | >10 |
| Example 8 PEPAES 15 | 10058 | 0.075 | 192 | 218 | | 1800* |
| Example 12 PETS 10058 | 10058 | 0.124 | 216 | 242 | | |
| Example 13 PTS 10058 | 10058 | 0.113 | 165 | 216 | | |
| Example 14 PPAES 15 | 10058 | 0.069 | 160 | 176 | | |
| Example 15 PETI 5496 | 5496 | 0.29 | 220 | 263 | ⁻300 | ⁻10,000 |
| Example 16 PEPI 5496 | 5496 | 0.15 | 210 | 290 | ⁻250 | ⁻600 |
| Example 17 PEPI 7500 | 7500 | 0.16 | 211 | 279 | ⁻260 | ⁻1,000 |

*Instrument used had the capability to measure low melt viscosities more accurately.

TABLE 2

NEW COMPOSITE MATRIX RESIN CHEMISTRY WITH IMPROVED PROCESSABILITY

| PROPERTY | PETI 5495 Example 15 | PEPI 5496 Example 16 |
|---|---|---|
| (350° C., 1 hour) | 260 | 281 |
| (371° C., 1 hour) | 263 | 291 |
| Film Tensile Strength, Ksi | 18.8 @ RT 12.2 @ 177° C. | 23.3 @ RT 14.1 @ 177° C. |
| Film Tensile Modulus, Ksi | 455 @ RT 332 @ 177° C. | 570 @ RT 411 @ 177° C. |
| Film Elongation, % | 32 @ RT 84 @ 177° C. | 8 @ RT 9 @ 177° C. |
| Minimum Dynamic Melt Viscosity, poise | 10,000 @ 371° C. | 600 @ 335° C. |
| Brookfield Viscosity of poly-(amide) acid in NMP at 35% solids and 25° C., centipoise | 30,000–40,000 | ⁻2000 |

TABLE 3

| PROCESSING CONDITIONS | Ti/Ti TENSILE SHEAR STRENGTHS[1], psi | | COHESIVE FAILURE, % | |
|---|---|---|---|---|
| | RT | 177° C. | RT | 177° C. |
| 15 psi, 288° C., 8 hours | 5000 | 4350 | 30 | 20 |
| 50 psi, 288° C., 8 hours | 4560 | 4535 | 40 | 40 |
| 15 psi, 371° C., 1 hour | 4750 | | 50 | |
| 25 psi, 371° C., 1 hour | 4400 | | 60 | |
| 50 psi, 371° C., 1 hour | 4300 | | 60 | |
| 15 psi, 316° C., 8 hours | 4800 | 4815 | 70 | 50 |
| 50 psi, 316° C., 8 hours | 4800 | 4410 | 70 | 40 |

[1]Pasa Jell 107 surface treatment, PETI 5496 primer (Example 15).

I claim:

1. In the process for the preparation of polyimides, in which diamines are reacted with dianhydrides in a solvent to prepare poly(amide) acids, which are then converted to corresponding polyimides, the improvement therein which comprises employing an effective amount of a trifunctional amine or anhydride monomer in the process to form an effective amount of a member selected from the group consisting of branched poly(amide) acids and star-shaped poly(amide) acids, which are then converted to the corresponding branched polyimides and star-shaped polyimides respectively, providing a mixture of polyimides having a lower melt temperature and a lower melt viscosity than corresponding linear polyimides of equivalent molecular weight.

2. The process of claim 1, wherein the trifunctional amine is a triamino pyrimidine.

3. A molding prepared from a mixture of polymeric materials prepared according to claim 1.

4. A film prepared from a mixture of polymeric materials prepared according to claim 1.

5. An adhesive prepared from a mixture of polymeric materials prepared according to claim 1.

6. A graphite prepreg prepared from a mixture of polymeric materials prepared according to claim 1.

7. A graphite composite prepared from a mixture of polymeric materials prepared according to claim 1.

8. A coating prepared from a mixture of polymeric materials prepared according to claim 1.

9. A wire coating prepared from a mixture of polymeric materials prepared according to claim 1.

* * * * *